United States Patent Office 2,963,512
Patented Dec. 6, 1960

2,963,512

PRODUCTION OF RACEMIC NAPHTHYLETHYL AMINES

Robert R. Bottoms, Crestwood, Ky., assignor to Chemetron Corporation, Chicago, Ill., a corporation of Delaware No Drawing. Filed July 26, 1956, Ser. No. 600,161

9 Claims. (Cl. 260—570.8)

This invention relates to the production of racemic alpha-(naphthyl)ethylamines. More particularly, it relates to the conversion of optically active alpha-(naphthyl)ethylamines to the corresponding racemic amines.

The alpha-(naphthyl)ethylamines have the general formula

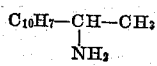

and can exist in two position isomers: alpha-(alpha-naphthyl)-ethylamine, wherein the side chain is attached to the alpha position of the naphthyl nucleus, and alpha-(beta-naphthyl)-ethylamine, wherein the side chain is attached to the beta position. Both of these position isomers contain an asymmetric carbon atom and each can, therefore, exists in a racemic form and two optically active forms.

The dextrorotatory isomers of each of the foregoing amines are useful resolving agents in the production of l-menthol from dl-menthol. d-Alpha-(alpha-naphthyl)-ethylamine and d-alpha-(beta-naphthyl)ethylamine form crystalline salts with l-menthyl hydrogen phthalate which are less soluble in methanol than the corresponding salts of d-menthyl hydrogen phthalate, and these salts are readily isolated in optically pure form from methanol. l-Alpha-(alpha-naphthyl) ethylamine and l-alpha-(beta-naphthyl)ethylamine are not as useful as resolving agents for dl-menthol acid esters, and, therefore, in the production of optically active alpha-(naphthyl)ethylamines for the resolution of dl-menthol to l-menthol, substantial quantities of the l-forms of the amines are obtained as by-products. While these l-amines are useful as resolving agents for acyl derivatives of synthetic amino acids, the production of the l-amines is greater than the requirement for these purposes. Consequently, substantial amounts of l-amines are produced for which there is no ready use.

The racemization of alpha-(naphthyl)ethylamines is very difficult to accomplish by conventional procedures. The amines are unusually resistant to racemization by hot acid or alkali. For instance, an optically active alpha-(naphthyl)-ethylamine can be heated with concentrated sulfuric acid at 150° C., with boiling concentrated hydrochloric acid, with 25% sulfuric acid at 200° C. in an autoclave, and with boiling 30% sodium hydroxide solution for long periods of time (eight to twelve hours) without any significant racemization. It has heretofore been impossible to recover valuable racemic amines from the undesired optically active alpha-(naphthyl)ethylamines by any reasonable procedure. This has rendered optical resolution employing optically active alpha-(naphthyl)ethylamines less efficient than resolutions with other amines, despite the desirable properties of such amines.

It is the object of this invention to increase the efficiency of the resolution of dl-menthol to l-menthol by reducing the cost of production of d-alpha-(naphthyl)-ethylamines. It is a further object of this invention to convert the by-product l-alpha-(naphthyl)ethylamines to racemic alpha-(naphthyl)ethylamines which can be thereafter resolved into optically active alpha(naphthyl)ethylamines by known methods. These and other objects of the invention will be apparent from the following disclosure.

According to the present invention, optically active alpha-(naphthyl)-ethylamines in dilute aqueous acid are reacted with nitrous acid to convert the amines to the corresponding secondary alcohols. The reaction is carried out at relatively high temperatures in the range of 75° to 125° C., preferably near the boiling point of the dilute aqueous acid. The equivalent quantity or a small excess of nitrous acid is produced in situ by the addition of a water soluble salt of nitrous acid such as sodium nitrite and potassium nitrite.

The resulting secondary alcohol is then separated from the aqueous acid solution and oxidized with chromic anhydride (chromium trioxide) or other hexavalent chromium compound, such as sodium or potassium chromate or dichromate, in aqueous acetic acid or other lower fatty acid. The secondary alcohol is oxidized to the corresponding methyl naphthyl ketone at a temperature of 40° to 100° C. upon treatment with an equivalent amount or a slight excess of hexavalent chromium salt. The desired ketone is isolated from the solution of aqueous fatty acid by dilution with water and separation. It may be further purified by fractional distillation.

The methyl naphthyl ketones are converted to alpha-(naphthyl)ethylamines by amination, either by the Leukhart method or by catalytic hydrogenation in the presence of ammonia. In the former method, the ketones are heated with a mixture of formamide and formic acid or a mixture of ammonium formate and formic acid at a temperature in the range of 150° to 200° C. until the evolution of ammonia and carbon dioxide ceases; the formyl derivative of the amine is hydrolyzed with hot mineral acid and the amine is liberated with alkali. In the latter method the hydrogenation is carried out in an inert organic solvent at 100° to 200° C. in the presence of a catalyst such as Raney nickel or a noble metal catalyst in the presence of at least 5 moles of ammonia per mole of ketone; the primary amine is readily separated from the reaction mixture by distillation.

The method which comprises this invention is applicable to any optically active alpha-(naphthyl)ethylamine. At present the d-isomers of such amines are more important commercially than the l-isomers and for this reason it is desirable to convert the l-isomers to racemic amines. In the event that the l-isomers are desired the method can be used to convert the d-isomers to racemic amines.

The following examples illustrate specific embodiments of the invention, but are not to be construed as limiting the scope thereof. It will be readily apparent to those skilled in the art that a variety of modifications of conditions and reagents may be made without departing from the invention. Amounts of materials are given in parts by weight and temperatures are recorded in degrees centigrade.

Example 1

170 parts of l-alpha-(alpha-naphthyl)ethylamine were dissolved in 200 parts of 20% hydrochloric acid. The resolution was agitated and heated to nearly its boiling point. 70 parts of sodium nitrite dissolved in 100 parts of hot water were introduced slowly beneath the surface of the dilute acid solution of the amine. During the reaction, an oily layer of alpha-(alpha-naphthyl)ethanol collected on the surface of the aqueous solution. After the addition of nitrite solution was complete, the oil was separated and dissolved in an equal weight of acetic acid. The solution was warmed to about 50° C. and stirred while a solution of 150 parts of sodium dichromate in 200 parts of 50% aqueous acetic acid was added slowly, After the addition was complete, the mixture was stirred for one hour at 50° C. and then diluted with 250 parts of water. The oily layer of methyl alpha-naphthyl ketone was separated, dried and distilled. A yield of 150 parts of ketone distilling at 168–173° C. at 15 mm. pressure was obtained.

*Example 2*

85 parts of l-alpha-(beta-naphthyl)ethylamine in 125 parts of 20% hydrochloric acid were treated with a solution of 35 parts of sodium nitrite in 50 parts of hot water as in Example 1. The oily layer of alpha-(beta-naphthyl)ethanol was separated and dissolved in an equal weight of acetic acid. The solution was heated to 50° C. and a solution of 50 parts of chromium trioxide in 50 parts of 50% aqueous acetic acid was added with good agitation. After the addition of the chromium trioxide solution, the reaction mixture was stirred for an hour at 50° C., then diluted with 200 parts of water. The layer of methyl beta-naphthyl ketone was separated, dried and distilled. The yield of product distilling at 170–173° C. at 15 mm. pressure was 85% of theory.

*Example 3*

A solution of 340 parts of alpha-acetonaphthone (methyl alpha-naphthyl ketone) in 480 parts of methanol containing 100 parts of anhydrous ammonia was placed in an autoclave with 50 parts of Raney nickel catalyst. The mixture was heated to about 170° to 175° C. after which hydrogen was admitted until the pressure was about 1000 lbs. per square inch. The mixture was agitated and hydrogen introduced continuously until no further absorption took place (usually 3 to 4 hours). During the hydrogenation the temperature reached 190° to 200° C. The solution was decanted from the catalyst and distilled to remove methanol. The residue of alpha-(alpha-naphthyl)ethylamine was distilled under vacuum and a yield of about 330 parts of amine assaying 95% primary amine was obtained.

The corresponding alpha-(beta-naphthyl)ethylamine can be made in the same way from beta-acetonaphthone (methyl beta-naphthyl ketone).

*Example 4*

A solution was made of 400 parts of 88% formic acid in 1500 parts of formamide and to it were added 1500 parts of methyl beta-naphthyl ketone. The mixture was heated to about 150° C. and then more slowly to about 180° C. The temperature was maintained at 180° to 185° C. for a period of about 3 hours, during which time ammonia and carbon dioxide were given off. The reaction mixture, consisting of the formyl derivative of alpha-(beta-naphthyl) ethylamine in solution in formamide, was then cooled to about 100° C. and poured into 2000 parts of cold water. The oily organic layer was separated and the water layer was extracted with about 400 parts of benzene. The benzene extract was added to the oily organic fraction and to the resulting solution was added a solution of 1000 parts of concentrated hydrochloric acid in 400 parts of water. The mixture was heated carefully to distill off the benzene and then slowly distilled for an hour longer to insure complete hydrolysis of the formyl compound. The residue was cooled and poured into 2000 parts of cold water. The mixture was washed with benzene and then treated with a solution of 850 parts of sodium hydroxide in about 2000 parts of water. The alpha-(beta-naphthyl)ethylamine separates as an oil and is separated and dried. The yield is about 85% of theory. The product may be purified by distillation.

Alpha-(alpha-naphthyl)ethylamine can be produced in the same way from methyl alpha-naphthyl ketone.

What is claimed as new and desired to be secured by Letters Patent of the United States is:

1. A method of racemizing optically active alpha-(naphthyl)ethylamine which comprises reacting said optically active alpha-(naphthyl)ethylamine with nitrous acid, thereby forming alpha-(naphthyl)ethyl alcohol, oxidizing said alpha-(naphthyl)ethyl alcohol thus obtained with a hexavalent chromium compound in acid solution to form methyl naphthyl ketone, and subjecting said ketone to reductive amination, thereby producing racemic alpha-(naphthyl)ethylamine.

2. The method of claim 1 wherein the reaction of the alpha-(naphthyl)ethylamine with nitrous acid is conducted in aqueous acid solution.

3. The method of claim 2 wherein the oxidation of the secondary alcohol with a hexavalent compound is conducted in aqueous lower fatty acid solution.

4. The method of claim 3 wherein the reaction with nitrous acid is conducted at a temperature in the range of 70° to 125° C.

5. The method of claim 4 wherein the oxidation with a hexavalent chromium compound is conducted at a temperature in the range of 40° to 100° C.

6. The method of claim 5 wherein the ketone is reductively aminated with hydrogen and ammonia in the presence of a hydrogenation catalyst.

7. The method of claim 5 wherein the ketone is reduced and aminated by reaction with formic acid and formamide.

8. A method of racemizing optically active alpha-(alpha-naphthyl)ethylamine which comprises dissolving an optically active alpha-(alpha-naphthyl)ethylamine in an excess of dilute hydrochloric acid at a temperature in the range of 75° to 125° C., adding thereto a solution of an alkali metal nitrite, separating the secondary alcohol thus formed, oxidizing said secondary alcohol with a hexavalent chromium compound at a temperature in the range of 40° to 100° C. in aqueous acetic acid solution, separating the methyl alpha-naphthyl ketone thus formed, and converting said ketone to racemic alpha-(alpha-naphthyl)ethylamine by catalytic hydrogenation in the presence of ammonia.

9. A method of racemizing optically active alpha-(beta-naphthyl)ethylamine which comprises dissolving alpha-(beta-naphthyl)ethylamine in an excess of dilute hydrochloric acid at a temperature in the range of 75° to 125° C., adding thereto a solution of an alkali metal nitrite, separating the secondary alcohol thus formed, oxidizing said secondary alcohol with a hexavalent chromium compound at a temperature in the range of 40° to 100° C. in aqueous acetic acid solution, separating the methyl alpha-naphthyl ketone thus formed, and converting said ketone to racemic alpha-(beta-naphthyl)ethylamine by reaction with formamide and formic acid.

References Cited in the file of this patent

FOREIGN PATENTS 915,810    Germany _____ July 29, 1954

OTHER REFERENCES

Fieser and Fieser, Organic Chemistry, page 233 relied on; D. C. Heath and Co., Boston (1950).

Wagner et al., Synthetic Organic Chemistry, John Wiley & Sons, New York, N.Y., 1953, pages 167–168, 323, and 662–664 relied on.